Dec. 2, 1930.  C. L. HOMMEL  1,783,935
SYSTEM FOR THE GENERATION AND DISTRIBUTION OF ELECTRIC ENERGY
Filed Dec. 12, 1925   4 Sheets-Sheet 1

INVENTOR
CHARLES L. HOMMEL
BY
ATTORNEY

Dec. 2, 1930.    C. L. HOMMEL    1,783,935
SYSTEM FOR THE GENERATION AND DISTRIBUTION OF ELECTRIC ENERGY
Filed Dec. 12, 1925    4 Sheets-Sheet 2

INVENTOR.
CHARLES L. HOMMEL
BY
Charles E. Wiser
ATTORNEY.

Dec. 2, 1930.   C. L. HOMMEL   1,783,935
SYSTEM FOR THE GENERATION AND DISTRIBUTION OF ELECTRIC ENERGY
Filed Dec. 12, 1925   4 Sheets-Sheet 3

INVENTOR.
BY   Charles L. Hommel
ATTORNEY.

Dec. 2, 1930.  C. L. HOMMEL  1,783,935
SYSTEM FOR THE GENERATION AND DISTRIBUTION OF ELECTRIC ENERGY
Filed Dec. 12, 1925  4 Sheets-Sheet 4

INVENTOR.
CHARLES L. HOMMEL
BY
ATTORNEY.

Patented Dec. 2, 1930

1,783,935

UNITED STATES PATENT OFFICE

CHARLES L. HOMMEL, OF DETROIT, MICHIGAN

SYSTEM FOR THE GENERATION AND DISTRIBUTION OF ELECTRIC ENERGY

Application filed December 12, 1925. Serial No. 74,985.

This invention relates to a system for the generation and distribution of electric energy, and the object of the invention is to provide an automatic electric generating system including an internal combustion engine, a high voltage generator, starting motor, low voltage starting battery and load circuit adapted, upon the closing of a translating device across the load circuit, to start the engine and generator by the battery and to deliver the generated current to the load circuit through the battery in a direction to charge the same.

A further object of this invention is to provide an automatic electric generating system consisting of several similar units, each including a generator and a prime mover for the operation thereof, adapted to deliver current in parallel to a common load circuit so arranged that on increase in current demand in the load circuit approximating the maximum output of the unit or units in operation other units are brought into operation consecutively and, that on decrease in current demand in the load circuit approximating the output of a unit, a single unit is automatically caused to cease to function.

Heretofore, apparatus for the production of electric current is made in various sizes and capacities depending upon the use to which the apparatus and system is to be put. This requires different sizes of generators, prime movers, etc., and an object of this invention is to provide a single small inexpensive unit automatically controlled by the demand for current in the load circuit and to provide an automatic control so that two or more units may be arranged in parallel to secure a system with any desired maximum current output. By this arrangement the cost of production may be very greatly lessened by reason of the fact that the entire plant for the manufacture of the apparatus and system may be devoted to one single thing and production costs minimized whereby the manufacturer in the electrical field is enabled to duplicate the manufacturing processes and methods in use in some other industries particularly the automobile industry. One of the principal objects of the invention is to secure a standardized unit—namely, an electric generating system including the generator, prime mover, circuits and relays that will be substantially uniform regardless of whether a system for the output of fifteen or ninety amperes per unit of time may be required. Thus, the object is to secure an economy in the manufacturing cost through practically confining production to one size of unit to secure volume production rather than the present method in which the manufacturers are producing units of various sizes and in comparatively small quantities.

An additional object of the invention is to provide an automatic system for the generation and distribution of electric current consisting of a series of units as stated whereby a purchaser in establishing a plant for a certain supposed demand may, upon the demand increasing, add units at a minimum of expense for parallel operation with the one or more units first installed. A further object of the invention is to provide a system consisting of a series of units for automatic operation as stated that is economical in operation in that only such number of units are in operation at any one time as may be required to supply the current demand of the load circuit. For instance, in the lighting of a small village there is a certain requirement in the day time for current very small in comparison to the demand during the evening. By use of my invention only such parts of the system as may be required to supply the current demand are in operation at any time and automatically are cut into or out of operation by the current demand.

A further object is to secure a system of the character stated that is automatic in operation and so arranged that successive units are cut into or out of operation by current demand without necessity of any manual control whereby the labor cost of operation of a lighting plant may be reduced to a minimum.

A further feature of the invention is involved in the arrangement of units so that the units are independent thus enabling any unit to be disconnected from the system and repaired or overhauled without disturbing operation of the remainder of the units, the capacity only of the system being reduced by the capacity of the unit or units removed. A further object of the invention is to provide an automatic system of the character stated consisting of several units each including a generator and an internal combustion engine for the driving of the same and a starting motor, there being a battery in conjunction with the first unit only for initially operating the first unit, the battery being automatically recharged by the generated current of the first unit and means being provided for automatically starting the second, third and additional units successively by the battery as the current demand in the load circuit approximates the amount delivered to the load circuit. With an internal combustion engine as a motive power either type of ignition may be used—that is, magneto ignition or battery ignition, and it is to be understood that the invention is not confined to either type of ignition as the fundamental feature of the invention is involved in the provision of several units each including an internal combustion engine and generator brought into operation in succession as the demand for current approximates the current output of the unit or units in operation and likewise automatically disassociates units in succession as the current demand falls to an extent approximately equal to the output of a single unit. These and other objects and novel features of the invention are hereinafter more fully described and claimed and the preferred form of construction of a system embodying my invention is shown in the accompanying drawings in which—

Fig. 3 is a diagram showing a series of three units arranged for automatic operation by a demand for current in the load circuit.

Figure 1:
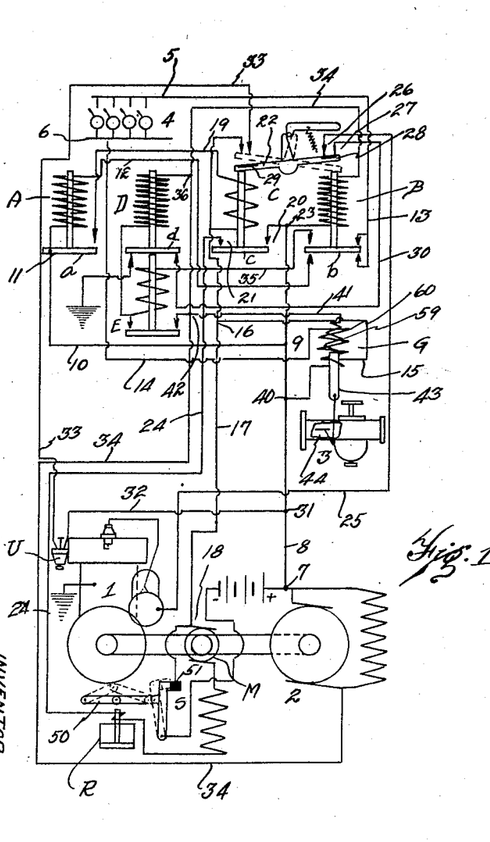
Fig. 1 is a diagram of a single unit showing an internal combustion engine as a motive power with the magneto type of ignition.

In order that a clear understanding may be had of the operation of the system, a single unit of the type shown in Fig. 1 is first described. In Fig. 1 an internal combustion engine having the magneto type of ignition is diagrammatically shown at 1, the generator is indicated diagrammatically at 2, and the carburetor at 3 (which is to be understood as being associated with the engine and is here shown disassociated for convenience in the making of the diagram). The generator is to be understood as being directly connected with the engine shaft and the starting motor M is here shown diagrammatically as will be readily understood. In the operation of the system disclosed in Fig. 1, upon the closing of any translating device 4 across the load circuit 5 and 6, the circuit formed and the sequence of operation of the system is as follows:—Current flows first from the positive side of the battery through the point 7 to line 8, to point 9, to line 10, to the point 11, the coil of the relay A, line 12 through the lower contacts of the relay B, to the line 13, to the load circuit 5, translating device 4, line 6, line 14, the series coil of the potential governor G to the line 15, point 16, line 17, point 18, safety switch S to the negative side of the battery. This current flow raises the switch bar $a$ of the relay A whereupon current flows from the positive side of the battery through the line 8, 10, point 11, switch bar $a$ of the relay A to line 19, the coil of the relay C and thence to line 17, safety switch and negative side of the battery operating the relay C and raising the bar $c$ of relay C to close the contacts 20 and 21.

Current will then flow from the positive side of the battery to line 8 to point 9, to point 23, through contact 20, switch bar $c$, contact 21, line 24, safety switch relay R, the starting motor M, the point 18, safety switch S to the negative side of the battery thus starting the motor. The operation of the relay C also opens the magneto short circuit and closes the electric primer and carburetor and heating unit circuit (hereinafter specifically described) through the interlocking switch as follows:—From the primary terminal of the magneto current flows through the line 25 to contact 36, and to the contact 27 on one end of the interlocking switch bar 22. This bar 22 has an inset contact member indicated by the heavy line 28 for these contacts 26 and 27 and has an inset 29 in the opposite end. Current flows from this contact 27 through the line 30 and through the lower contacts of the relay D and bar $d$ to ground. The operation of the relay C opens the magneto short circuit at the points 26 and 27.

The heating unit circuit for heating the fuel in the carburetor is formed as follows:— From the positive side of the battery to the point 7, to line 8, to the point 31 and lines 32 to the heating unit U, line 33 to the contact plate 29 of the member 22 thence through line 17 to point 18 and safety switch S to the negative side of the battery. The unit U heats the fuel by electric current and insures a proper charge being formed at all times for the internal combustion engine which is under initial motion by the starting motor M.

The engine thus begins to operate under its own power and, as it comes up to speed, the current generated passes to the point 7, line 8, the point 23, coil of the relay B, line 34 back to the generator. This operates the relay B, raising the bar b and disconnecting the power from all previously established circuits and releases the relays A and C and changes the position of the interlocking switch bar 22 and establishes a new circuit for current from the generator and again grounds the terminal of the magneto through the contacts 26 and 27 and line 30. In the newly established circuit current from the generator passes from the point 7 through the battery and safety switch S to the point 18, line 17, point 16, the series coil of the governor G, line 14, translating device on the load circuit, lines 5 and 13, the upper contacts and switch bar b, line 35 and relay E, to the relay D, to the point 36, line 34 to the opposite side of the generator. This current flow operates the relay member D holding the magneto short circuit open by the raising of the bar d which would otherwise be closed through movement of the interlocking switch 22. The operation of the relays B and D is practically simultaneous, the ignition circuit being at all times maintained closed. Further, as all the current flowing through the load circuit also flows through the battery in a direction opposite to the flow of current produced by the battery itself, the battery is recharged at a rate proportional to the demand for current in the load circuit. When the current flow to the load circuit exceeds the capacity of the relay D, the relay E operates to maintain the ignition circuit closed previously so maintained by the relay D with which it is mechanically interlocked. The operation of the relay E short circuits the winding of the relay D thus preventing overheating of the relay D.

The circuit through the shunt coil of the potential governor G is as follows:—from the generator, to point 7, to line 8, to point 40, to the shunt coil of the governor, to line 41, to point 42, to line 34, to the generator. The potential governor consists of a movable core 43 connected with the throttle 44 of the carburetor 3, the movable core being operated by a solenoid consisting of a series and a shunt winding so connected as to generate an opposing magneto-motive force, the shunt winding generating the stronger force tending to close the throttle. The series winding generates a magneto-motive force in proportion to the load on the load circuit and tends to open the throttle. Either gravity or spring tension may be utilized to hold the throttle open. The solenoid core and the throttle to which it is connected therefore will assume a given position for each variation in the generated voltage and connected load and maintain the potential of the load circuit constant. When the last translating device is disconnected from the load circuit current no longer flows from the generator to the load circuit through the relays D and E. These relays are therefore disengaged and release their armatures thereby short circuiting the magneto through the lower contacts of the switch bar d and consequently stops the engine. All relays thereupon assume their original position as the battery has been previously disconnected from the circuits. The relays having assumed the original position are ready to repeat the cycle of operations described when any device on the load circuit is again connected thereacross. The safety switch S and relays R therefor are designed to prevent the exhausting of the battery due to the engine failing to start readily or by reason of lack of fuel or other cause. It consists of the connected solenoid R in series with the starting motor circuit in the line 24. This solenoid has a movable core connected with the piston of a dash pot as is diagrammatically illustrated so arranged as to open the switch between the battery and the rest of the system when the solenoid core or piston of the dash pot reaches nearly the top of its limit of travel. The switch S has connected therewith a two-part arm 50 connected together immediately over the solenoid core and upward movement of the core raises this lever 50 to the position shown in dotted lines in the drawing and withdraws the switch bar S from its contact 51 breaking the connection of the motor M with the battery. This switch must be reset manually before the system is in condition to resume its cycle of operation. The time required to release the safety switch varies with the amount of current required by the starting motor and the size of the relief opening in the dash pot. When the current no longer flows through the starting motor the dash pot piston returns to original position.

Figure 4:
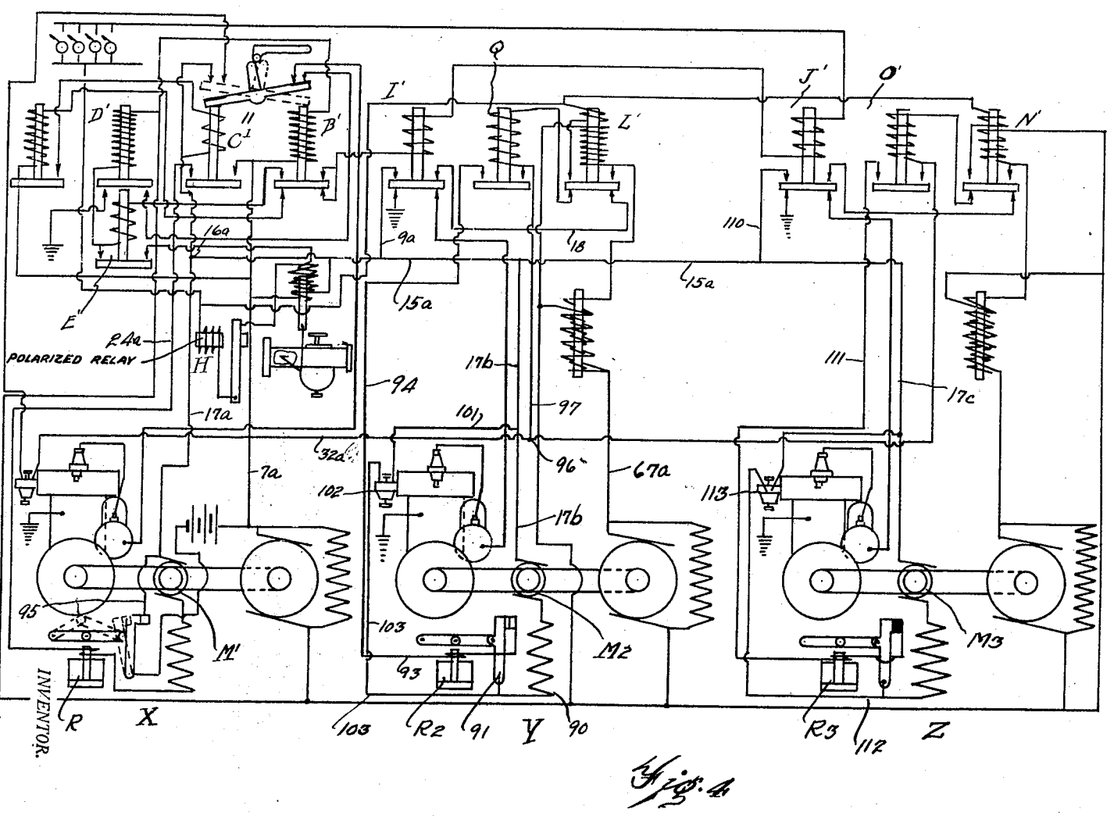
Fig. 4 is a diagram showing a series of three units arranged for automatic operation by current demand in the load circuit in which the starting battery of the first unit is used to start other units successively.
Figure 5:
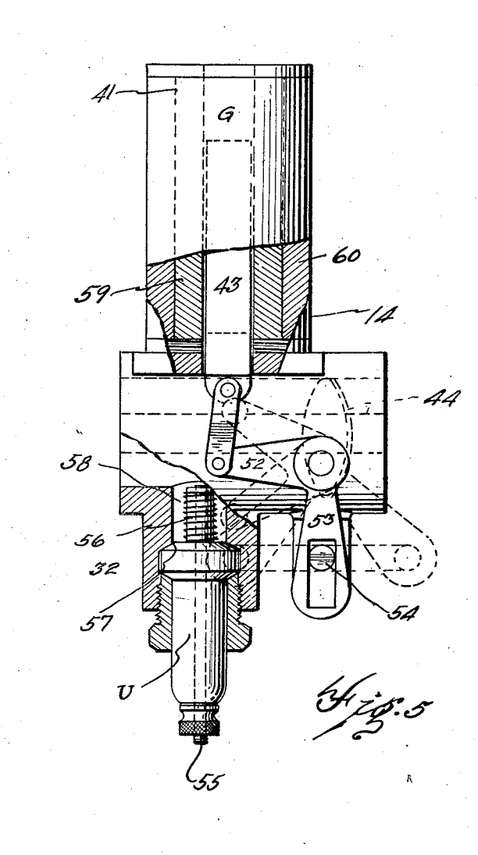
Fig. 5 is a plan view partly in section of an electromagnetic throttling governor and heat unit preferably utilized with the internal combustion type of motive power.
Figure 6:
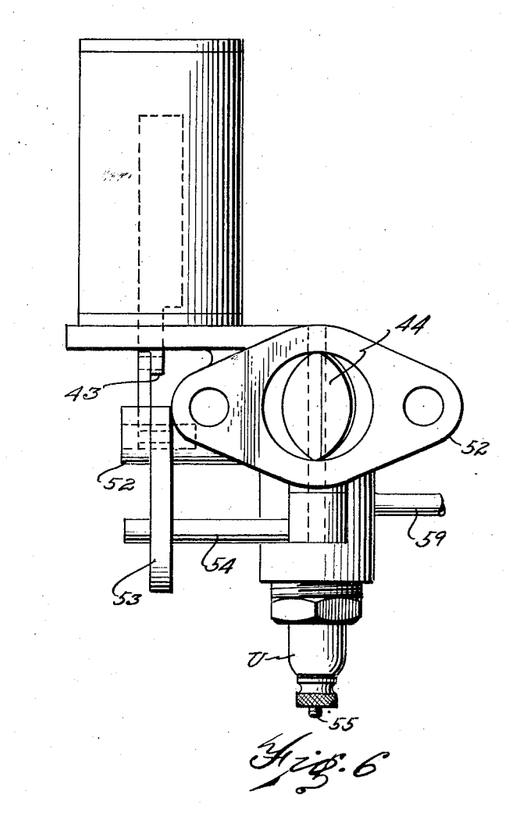
Fig. 6 is an elevation taken from the right hand side of Fig. 5.

The electric primer heating unit and throttle governor are shown more fully in Figs. 5 and 6. In the diagram Fig. 1, the heating unit is shown at U and the carburetor at 3. In practice these elements are in close association, the solenoid G and heating unit being shown in the preferred mechanical structure in these Figs. 5 and 6. The solenoid core 43 is shown as connected by a link to one arm of the bell crank lever 52, the other end 53 of which is slotted as shown in Fig. 5 into which extends the arm 54 providing the throttle lever for the valve 44. This bell crank lever having the arms 52 and 53 is pivotally supported on one side of the air conduit and the position of the bell crank lever in Figs. 5 and 6 is with the throttle half open and this lever may be turned to the left of the position shown in Fig. 4 to close the throttle or to the right thereof to fully open the same. In starting, the plunger 43 drops by gravity to its lowermost position operating the bell crank and moving the throttle lever 54 to the extreme right of the position shown in dotted lines in Fig. 5 fully opening the throttle. When the starting motor starts to crank the engine, current flows from the battery through the terminal rod 55 of the heating unit U and through the heating element 56, which is grounded at 57 in the seating of the element in the hub provided therefor on the air conduit, and thence through the ground connection to the battery. There is a pocket 58 formed in the body of the air conduit in which the heating element 56 is positioned and this forms a priming well which is filled with fuel by a fuel line 59 to the carburetor bowl and maintained at a constant level by the level of the fuel in the bowl. On the starting of the motor this element 56 becomes heated driving off a fuel vapor which is drawn into the engine and, due to its high state of vaporization, is readily ignited even when the cylinder is cold and thus insures proper starting of the engine at all times. As the engine starts the current is cut off from the element and allows the carburetor to provide proper explosive mixture for the operation of the engine, the fuel in the priming well 58 remaining inactive with the exception that slight evaporation may take place.

When the generator comes up to speed the shunt coil 59 of the solenoid G (which is in the line 41) is connected across the generator terminals and is energized lifting the solenoid 43 and thereby closing the throttle valve 44. The weight of the solenoid plunger 43 and the magnetic pull of the shunt coil is so proportioned that, when the generator is producing full voltage and with no load on the load circuit, the plunger 43 is in its maximum upward position with the valve 44 closed. The series coil 60 is in the line 14 and in series with the load circuit and is so proportioned that the magneto-motive force which it generates opposes that of the shunt coil by an amount sufficient to balance the plunger 43 at a position to give a certain throttle opening and therefore a speed of operation of the engine to maintain the generator voltage constant at any load within the range of the generator output. Thus under full load the series coil 60 opposes the shunt coil 59 to such extent that the weight of the plunger 43 exceeds the effective pull of the shunt coil permitting the valve 44 to occupy maximum position.

This description of the throttle control and heating unit is believed sufficient to make clear the operation of the combined governor and heating unit. This unit is arranged to produce a certain maximum output of current of desired voltage and is useful for all generating systems up to its capacity and in practice is sufficiently small as to provide a complete separate unit for a small number of lights in a system as might be required for a farm home for instance. In other words—it is adapted in practice for an output of about fifteen amperes.

The aim of this invention is not only to provide a small unit as heretofore described that is automatic in its operation by the connecting or the disconnecting of a translating device across the load circuit but there is a further object of the invention in that it provides a unit of a minimum required capacity as to ampere output and to add additional similar units to secure a generating system of any desired capacity of output. The single unit described involves peculiar characteristics in the arrangement of the circuits, relays etc., adapting it for use in conjunction with other light units of similar capacity, each of which involves an internal combustion engine and generator, ignition system and heating unit whereby duplication of the major parts of the system is secured. This enables a plant manufacturing such systems to manufacture all of the essential parts requiring machining on a production basis and by thus devising a system which for any electric generating system of whatever capacity is merely a duplication of parts, the cost of production can be reduced very greatly and for this reason can be delivered to purchasers at a low initial cost. A further saving to purchasers is occasioned by the fact that, having installed a system of one or more units, the purchaser is enabled to increase the current output merely by the addition of one or more of the same type of inexpensive unit. Therefore earlier purchased apparatus with this type of generating system need not be scrapped when the demand for current reaches the maximum output of the system. The purchaser upon approach of demand to this point may merely add a small and inexpensive unit to the system already in operation and thus need only install inexpensive units to keep pace with the demand. This method cannot be used with the present type of apparatus and secure an automatic system as each unit under the present character of systems sold is an independent unit requiring an operator to bring one or more units into operation or to cause the same to cease operation. As will be noted from the description to follow, there is some change in the relays and wiring of the additional units to be added. I have shown a multiple unit system in Fig. 3 and the first unit to the left of the figure is a duplication of that shown in Fig. 1 having the magneto type of ignition. The relay system and arrangement of the solenoids are the same. There is, however, the addition of a switch or polarized relay H in the line 14 in which is the series coil 60 of the carburetor heretofore called the potential governor.

The system embodying a series of units can be either of two types—that is, a type in which a starting motor is used with each unit of the system, a battery being utilized with the first unit of the system and applied to the starting motors of the other units of the system as the demand for current approaches that delivered to the load circuit, the arrangement providing that the battery is recharged by current generated by the first unit only. This type of system is shown in Fig. 4. The system shown in Fig. 3 dispenses with the starting motor in all the units except the first unit and the generated current of the first unit is applied successively to the generator operating as a motor in the second, third or other units. Each cranks the engine of the respective unit and cuts off the generated current of the first unit therefrom as the additional unit comes up to speed by its own engine. This last system will be first described.

The system shown in Fig. 3 is in non-operating position, all connections being on open circuit. Assuming that the circuit is closed by the connection of a translating device across the load circuit the circuits formed and the sequence of operation of the system are as follows:—First, current flows from the positive side of the battery, to point 7, to line 8, to point 9, to line 10, to point 11, to relay A, to line 12, to lower contacts of the relay B through the bar $b$ to line 61, to relay I thence through relay J to line 5 of the load circuit through any translating device 4, to the line 6, to line 14, polarized relay H and the series coil 60 of the potential governor, to line 15, to point 16, to line 17 and safety switch S to the negative side of the battery. This operates the relay A which establishes a circuit through the relay C as follows:—the positive side of the battery to the point 7, to lines 8, 10, to the switch bar of the relay A, to line 19, through relay C, to line 17 and safety switch, to the negative side of the battery. This operates the relay C and establishes the circuit for the starting motor M as follows:—from the battery to the point 7, to line 8 to the point 23, switch bar $c$, to line 24, to the relay R through the starting motor to the safety switch and negative side of the battery. The ignition circuit and the electric primer and heating unit circuits are established in like manner as described relative to Fig. 1 and the engine begins to operate under its own power, comes up to speed and disconnects all previously established circuits from the battery and establishes the following circuit for the current from the generator. From the positive side of the generator through the positive side of the battery thence through the safety switch, to point 18, to line 17, to point 16, to line 15 and series coil 60 of the potential governor, to polarized relay H, to line 14 and load circuit 6, to connected translating device on the load circuit, to the relay J, to the relay I and line 61, to the upper contact of the relay B, to line 35 to relay E and relay D, to line 34, to the negative side of the generator.

This first set of the series in Fig. 3 marked "Set 1" operates in all general respects practically exactly as the single unit of Fig. 1, the relays, circuits etc., being exactly similar except for the circuit through the relays I and J and all current supplied to the load circuit by the generator of the set 1 flows through the battery in the proper direction to recharge it. The relays I and J are control relays for sets 2 and 3 respectively and as other sets are added they will each include a similar relay permanently in series with the load circuit and controlling operation of the respective set and are designed to operate when the current supplied to the load circuit nearly equals the capacity of the set or sets in operation. For instance, take the control relay I for the set 2. The relay I may be designed to operate on a fourteen ampere current flow if the set 1 is designed to generate a fifteen ampere current. Therefore, when the current supply to the load line is about fourteen amperes, the relay I will operate opening the magneto short circuit of set 2 at the lower contact of the relay I. The relay J will operate and open the short circuit of the magneto for the set 3 when current supplied to the load circuit is about 28 or 29 amperes bringing set 3 into operation as will be understood from the following:—Current to start set 2 is supplied by the generator of set 1 to the generator of set 2 which acts as a motor to crank the engine $1^a$ of set 2 by means of the following circuit—With the relay I operated and the magneto short circuit of set 2 opened, the upper contacts of the relay I are closed. The current then flows from the plus side of the generator 2 of set 1 to line 8, to point 62, to line 63, to line 64 through the upper contacts of the relay I and then through the resistance K and heating unit U—1 in parallel and then through the lower contacts of the relay L to line $66^a$, the series coil $60^a$ of the potential governor for set 2 and lines 67 and 68 to line 34 which is common to all the generator sets and thus to the negative side of the generator 2 of the set 1. The resistance of the electric primer heating unit U' and the resistance K in parallel therewith is sufficient to limit the current through the generator $2^a$ of set 2 to an amount that will not be an excessive load on the generator of set 1 but will at the same time permit the generator $2^a$ of the set acting as a motor to rotate the engine $1^a$ with which the generator $2^a$ is directly connected. As the engine $1^a$ of the set 2 begins to operate on its own power and comes up to speed current will flow from the generator $2^a$ by the lines 67 and $66^a$ through the shunt coil 69 of the relay L (when the potential generated by the generator 2ᵃ exceeds the potential of the load circuit less the potential drop across the electric primer and carburetor heating unit in parallel) and causes the relay L to operate when the potential of the generator 2ᵃ practically equals the potential of the load circuit. It is to be noted that the potential across the shunt coil 69 of the relay L supplied by the generator 2 of set 1 is insufficient to operate the relay when current is supplied by set 1 to start set 2. The circuit closed to operate the relay L is as follows:—the generator 2ᵃ, to line 67, to series coil 60ᵃ of the potential governor for set 2, to shunt to coil 69, to relay 1, to line 70, to line 34 and to generator 2ᵃ. The operation of the relay L by a flow of current through the circuit mentioned causes the current from the generator 2ᵃ to flow to the load circuit in parallel with current supplied by the generator 2 of set 1. This is accomplished by means of the following circuit:—plus side of the generator 2ᵃ to line 67, to series coil 60ᵃ, to line 66, to the upper contacts of the relay L through the series coil 71 of relay L to line 72, to line 14, to load line 6 in parallel with current from the generator of set 1, thence through the connected translating devices on the load circuit, to line 5, relay J, line 73, to relay I, to upper contacts of the relay B, to relay E, to the upper contacts of the relay E, to point 42, to line 34, to negative side of the generator 2ᵃ. The current for the shunt coil of the potential governor of set 2 is as follows:—generator to line 67, to shunt coil 59ᵃ, to point 74 and line 70 to negative side of the generator. This potential governor for set 2 is identical with that of set 1 having a series and shunt winding so connected as to generate an opposing magneto-motive force. The shunt winding generating a stronger force tends to close the throttle and series winding generates a magneto-motive force in proportion to the load tending to open the throttle. Either gravity or a spring may be utilized to hold the throttle open and under these opposing magneto-motive forces the throttle will assume a given position determined by the generated voltage and the connected load and will maintain the potential at the load constant.

The operation of the relay L disconnects the resistance K and the electric primer and carburetor heating circuit of the set 2 from its source of current. The series winding 71 of the relay L and the similar winding of the relay N of set 3 is so wound as to assist the shunt winding of the respective relays in supporting the armature as long as current flows through it from the generator of the respective set; but when current flows from one generator to another in a direction tending to drive the other as a motor it will flow through the series winding in a direction to oppose the shunt winding thereby releasing the armature of the relay disconnecting the motor generator from the driving generator.

The polarized relay H of the set 1 performs the same function in the set 1 as these series coils of the relays L and M of the sets 2 and 3—that is, any reversal of the current through the coil of the polarized relay will cause it to disconnect the generator of set 1 from the load circuit.

When the current flowing through the relay I is no longer sufficient to support its armature—that is, when the demand for current in the load circuit is below 14 amperes for instance in the example previously given—it drops clothing the lower contacts by the switch bar of the relay I and short circuits the magneto of set 2 thereby stopping the engine from driving of that set. The series winding of the relay L prevents the motoring of the generator 2ᵃ by the generator 2 of the set 1 as previously explained.

When the demand for current in the load circuit nearly equals the combined capacities of the generators 2 and 2ᵃ of the sets 1 and 2 the relay J is operated which is the controlling relay of set 3. This relay is so wound as to require a certain amperage of current to operate the same and operates in a manner corresponding to the described operation of set 2. In fact the operation of the relay system of set 3 is an exact duplication of that of set 2 except for the capacities of the respective control relays J and I. Any number of generator sets can be automatically operated in parallel if arranged as duplicates of sets 2 and 3 except as to the capacity of the relays corresponding to J and I of the two sets here shown.

The system consisting of several units as above described is one in which the generator of the set 1 is utilized to start the successive units. Each unit, however, may have its own starting motor. Such a system is shown in Fig. 4, being the units X, Y and Z corresponding to sets 1, 2 and 3 of Fig. 3 but having this difference in that each set has an independent starting motor and circuits therefor including a safety switch in each circuit and a relay in sets Y and Z for connecting the battery of the set X with the motor of the set Y or Z when current in the load circuit is increased to a certain amount. Set X is started in the usual manner as heretofore described with the other sets by the closing of a translating device across the load circuit and the circuits are energized and relays operated in the same general sequence as has previously been described. There is this difference, however, in that the line 15ᵃ, which corresponds to the line 15 of set 1 of Fig. 3, is extended and becomes a common line of the starting motor circuit each being connected therewith by lines 17ᵃ, 17ᵇ and 17ᶜ of the respective motors M1, M2 and M3. The safety switch arrangement of the sets X, Y and Z is a duplicate of that of set 1 of Fig. 3.

The starting motor circuit of the set X is closed by operation of the relay C' as follows—from the plus side of the battery to line 7ª, through the contacts closed by relay C', to the line 24ª, to relay R1, to the starting motor M1, to the safety switch and line 95 to the negative side of the battery. The ignition circuit for this set X is made in the same manner as described relative to set 1 of Fig. 3 as is also the electric primer and carburetor heating unit circuit. Upon the starting of the motor of set X and generation of current, the generated current operates the relay B1 in this set X and thereby disconnects all previously established circuits and forms the circuit as previously described for the generated current through the connected devices on the load circuit and as in the previous instance all the generated current supplied to the load circuit by set X flows through the relays D1 and E1 corresponding to D and E of set 1. Therefore, when the last translating device on the load circuit is disconnected current ceases to flow through these relays D1 and E1 permitting the bar to drop and short circuit the magneto through the lower contacts to relay D1. Also in this set X all current supplied to the load circuit by the generator of this set flows through the battery in the proper direction to recharge it. Relay I' is the control relay for the set Y and is designed to operate when the current supplied to the load circuit nearly reaches the capacity of the generator of set X. Upon operation of the relay I' the magneto short circuit for set Y is broken through the lower contacts of the relay and the starting motor circuit for set Y is formed as follows—from the battery of set 1, through the line 7ª, to the line 32ª, to the point 96 and line 97 through the relay Q, to the lower contacts of the relay L1, to line 98, to the upper contacts of the relay I', to the line 99, line 15ª, to point 16ª and to line 17ª, to the safety switch, to the negative side of the battery. This operates the relay Q and establishes the starting motor circuit and electric primer and carburetor, and heating unit in parallel therewith for the set Y as follows—from the battery of set X, to line 7ª, to line 32ª, to point 96, to line 97 to contacts of relay Q, to line 94 and line 93 and coil of the control of the relay R2, to the safety switch and through the starting motor, to line 17ᵇ, to the line 15ª of set X, to safety switch of the set X, to the negative side of the battery. The electric primer and carburetor heating unit established in parallel therewith is from the line 17ᵇ, to the line 101, to the heating unit 102 and line 103 which connects with the safety switch of the set Y. As this engine is actuated by the motor M2 of the set Y and begins to operate, current flows from the generator as follows—first, from the generator of set Y through the line 67ª, shunt coil of the potential governor and coil of relay L' operating the relay L' in the same manner as the relay L of the set 2 of Fig. 3 is operated and operation of the relay L' disconnects the battery circuit from the relay Q thereby stopping the starting motor for this set and the carburetor, primer and heating unit. Current now flows from this set Y to the load circuit in parallel with current from the companion set X. The series winding of the relays L' and relay N1 of set Z is wound so as to assist the shunt winding in supporting the armature of the respective relays as long as current flows through it from the generator of the respective set; but when current flows from one generator to another in a direction tending to drive the other as a motor, it will flow through the series winding of the respective relay in a direction to oppose the shunt winding and thereby release the armature of the relay and disconnect the motoring generator from the driving generator as has been previously explained with the generators of the units 2 and 3 shown in Fig. 3.

When the demand for current in the load circuit nearly equals the combined capacity of the generators of the sets X and Y, the control relay J1 will operate to start the set Z. The operation of this relay establishes the ignition circuit by removing the ground from the primary of the ignition circuit through the lower contacts of the relay. The starting motor relay circuit for this set Z is as follows—From the battery of the set X, to line 7ª, to line 32ª, to the coil of the relay O1 through the lower contacts of the relay N1 and the upper contacts of the relay J1, to the line 110, to line 15ª, to point 16ª and line 17ª of the set X, to the safety switch of the set X, and to the negative side of the battery. This operates the relay O1 and establishes the following circuit—From the battery of the set X, to line 7ª, to line 32ª through the switch bar of the relay of the relay O1, to line 111, to relay R3 and the safety switch, to the line 112 and through the starting motor and also through this line 112 to the carburetor and primer heating unit 113, to the line 17ᶜ, to the line 15ª, and thence through the line 17ª of the set X to the safety switch, to the negative side of the battery. This operates the motor of the set Z and the engine is started and circuit establishes in a similar manner as with set Y. The generator of this set supplies current in parallel with the generators of the other sets. The operation of the relay N1 disconnects the battery circuit thus stopping the starting motor. The carburetor primer and heating unit and the relay system of the sets Y and Z are exact duplicates except for the respective capacities.

The units and the system of units previously described have all been provided with internal combustion engines and magneto ignition and current from the generator or the battery of the first unit is utilized to start the next and succeeding units upon current demand in the load circuit exceeding a predetermined amount, the systems being entirely automatic in operation bringing into operation successive units and likewise disconnecting successive units as the current demand in the load circuit increases or diminishes. The fundamental idea of the invention of applicant can also be secured by means of the system and arrangement of the circuits of Fig. 4 in which a separate starting motor is utilized to start the successive units by a single battery, the battery being applied to the starting motors of the several units and starting operation of the successive units upon predetermined current demand in the load circuit, and it is therefore evident that this fundamental invention of applicant is not confined to either of the types of the systems of Figs. 1, 3 or 4.

Figure 2:
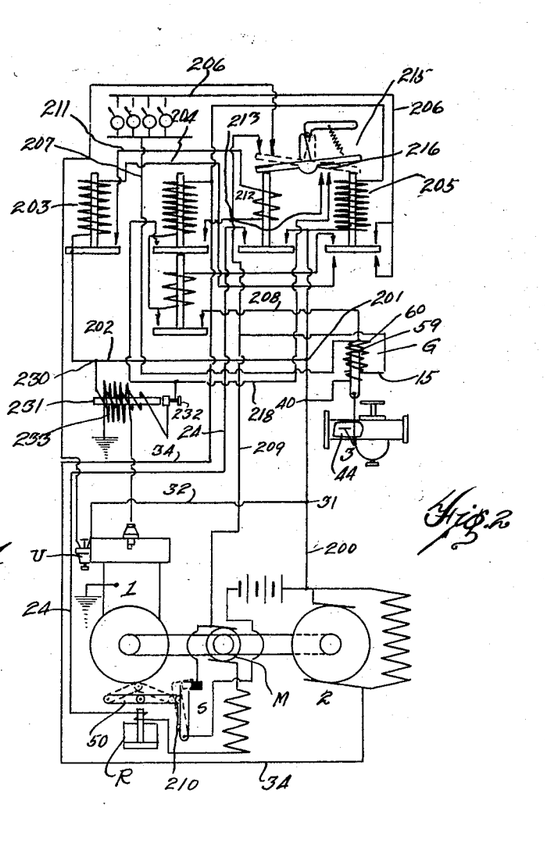
Fig. 2 is a single unit with the battery type of ignition.

Likewise this fundamental invention may be secured with an internal combustion engine utilizing a battery ignition as is shown in Fig. 2. The connecting of a translating device across the load circuit establishes the following circuits:—From the plus side of the battery, to line 200, to point 201, to line 202, to relay 203, to line 204, to lower contacts of relay 205, to line 206 through the connecting translating device, to line 207, to the series coil of the potential governor, line 15, to line 209, through the safety switch 210, to the negative side of the battery. This operates the relay 203 establishing the following circuit—from plus side of the battery, to line 200, to point 201, to line 202, through the switch bar of the relay 203, to line 211, to relay 212, to the point 213, to line 209 through the safety switch, to the negative side of the battery. This operates the interlocking switch 215 and closes the contacts 216 forming the primary circuit of the spark coil as follows—plus side of battery, to line 200, to point 201, to line 202, to point 230, to coil 231, to interrupter 232, to line 218, to contact 216, to point 213, to line 209, to safety switch, to negative side of the battery. The induced secondary circuit is from ground through coil 233, to spark plug, to ground. The electric carburetor primer and heating unit circuit is closed by operation of the relay 212 and the various other circuits are established as with the unit shown in Fig. 1. The generated current, as the engine comes up to speed actuates the relay 205 breaking the lower contacts of the relay 205 and closing the upper contacts and also breaking the starting motor circuit at the point 216, due to the switch bar 215 being raised by the plunger of the relay 205. The remaining relay circuits are energized and operation of the system is identical with the operation heretofore described, the battery being recharged at a rate proportional to the demand for current on the load circuit.

From the foregoing description of the various arrangements of an electric generating system embodying applicant's invention it is evident that the following results are secured—Firstly, an automatic system is secured which is set into operation and caused to cease to operate by turning on or off any translating device in the load circuit; that the starting battery which is of small capacity now commonly used in the starting systems of automobile engines is recharged in series with the load circuit across the generator and is used for control purposes only in any of the arrangements of the system herein shown.

A feature of the invention is to secure uniformity of construction so that, irrespective of the amount of current to be generated, the production of a manufacturing plant is confined to a single standard article particularly so far as generator, motor, heating unit, carburetor, potential governor and majority of the relays are concerned, and the only difference in the relays is in the control relays for the additional units which are so wound that the relay can only be operated at a certain predetermined current demand in the load circuit. A feature of the invention is in the use of a relay for controlling the initiatory steps of starting the engine, the relay and circuit being in series with the load circuit only when the engine is not in operation and entirely disconnected from all circuits during operation of the engine and the output of generated current. A further feature is in the use of an interlocking switch between the starting motor switch and the main line switch for establishing an ignition circuit for the internal combustion engine whereby the potential generated by the generator in opposition to the battery potential can cause a release of the starting motor switch without breaking the ignition circuit. There is a further feature in that more than one unit is controlled by means of the current demand supplied by an operating set whereby upon the demand exceeding a predetermined value without reference to the original means is utilized to start a second or additional units successively. There is also the feature of the battery charging, it being charged in series with one unit only in a multiple unit system thereby limiting the charging rate to the value of the current supplied by the one unit regardless of the number of units in parallel on the load circuit. Another feature of the invention is involved in the means used to prevent one generator from driving another in either form of the multiple system herein described. It is also to be noted that the control relay for the first unit is entirely disassociated from the load circuit during operation of the generator. There is a further feature in the use of two or more mechanically interlocking holding coils for maintaining the ignition circuit, each coil being of different resistance and being so arranged that the operation of each coil will short circuit all coils of a higher resistance and also mechanically maintain them in their respective operating positions thereby preventing undue heating or burning out of the higher resistance and more sensitive coils used in maintaining the ignition circuit at the lower current values. It is also to be noted that the magnet windings are shown for the purpose of illustration only and do not indicate direction of the current flow or the consequent polarity and also while the shunt wound generator is diagramatically indicated a compound wound generator can be used.

From the foregoing description it is believed evident that a unit and system composed of several units is of simple and inexpensive form due to the standardization of the unit the cost of manufacture of large systems is reduced to the minimum and that the various objects of the invention are secured.

Having thus fully described my invention, what I claim is—

1. In an automatic electric generating system, the combination with an electric generator and internal combustion engine for driving the same, of a storage battery, an electric starting motor operated by the battery, a load circuit having translating devices adapted to be connected thereacross, an electro-magnetic relay operated by a current from the storage battery upon the connection of any translating device across the load circuit whereby an ignition circuit is established for the engine and the storage battery is connected to the starting motor to cause its initial operation, the generator being electrically disconnected from the battery during the initial operation of the system, a relay operated by the potential of the generator to establish a circuit from the generator to the load circuit in series with the storage battery and simultaneously disconnect the storage battery from previously established circuits, and a relay in series with the load circuit adapted to maintain the ignition circuit closed as long as any translating device is connected across the load circuit and to open the ignition circuit to stop the engine upon disconnection of the last translating device in the load circuit.

2. In electric generating systems, a high voltage generator disconnected from the load circuit during the initiatory steps of starting the system, an internal combustion engine adapted to drive the generator, a low voltage storage battery, electric starting means operable from the battery, a high voltage load circuit, means for temporarily admitting the low voltage current to the load circuit to control the initiatory steps of the starting means and subsequently complete the starting of the engine from the same source of low voltage current and means causing high voltage current from the generator to pass through the battery to the load circuit in a direction to charge the same.

3. In an electric generating system, a series of electrical generating units each adapted to discharge current in parallel to a load circuit, the first of said series including a starting motor and a battery, internal combustion engine and generator and an ignition circuit for the engine and the remainder of the series being similar without starting batteries, means whereby demand for current in the load circuit applies the power of the battery to the starting motor to start operation of the first unit completing the ignition circuit therefor and means whereby upon the unit coming into operation it discharges current to the load circuit through the battery in a direction to charge the same, means whereby on current demand in the load circuit approximating the amount discharged thereto by the first unit, the battery is applied to the starting motor of another unit, the ignition circuit therefor closed and the second unit caused to operate under its own power, means whereby on continued increase in demand for current in the load circuit other units are brought into operation successively, means whereby decrease in current demand in the load circuit in an amount approximately equal to that produced by a unit a single unit is caused to cease to operate by disconnection of its ignition circuit, and means in series with the load circuit and generator of the first unit adapted to maintain the ignition circuit of the first unit as long as any translating device is connected across the load circuit and adapted to disconnect the ignition circuit upon disconnection of the last translating device across the load circuit.

4. In an electric generating system, a series of electric generating units adapted to discharge current in parallel to a load circuit, each of the units including an internal combustion engine, a generator, an ignition circuit and a starting circuit, the first unit only including a low voltage battery in the starting circuit, means controlling the starting of the engine of the first unit by the battery upon the closure of a translating device across the load circuit, automatic means for disconnecting the battery from the starting circuit upon operation of the engine and generator, the current from the generator of the first unit only being discharged to the load circuit through the battery in a direction to charge the same, means whereby demand for current in the load circuit approximately equal to the capacity in the first unit connects the starting circuit of the succeeding unit with the battery of the first unit, and means whereby the battery is automatically disconnected from the starting circuit of the second unit upon the said second unit discharging current to the load circuit thereof from the generator.

5. In an electric generating system, a series of electric generating units each including an internal combustion engine and a generator driven by the same, a separate starting motor for each unit, each unit of the series being adapted to supply current to a common load circuit, a low voltage battery, a circuit including the load circuit and battery controlled by any demand for current in the load circuit and adapted to start operation of the first unit of the series, means controlled by current demand in the load circuit controlling the starting and stopping of the units of the series, and means for recharging the battery.

In testimony whereof I sign this specification.

CHARLES L. HOMMEL.